United States Patent
Toscano et al.

(10) Patent No.: US 8,750,701 B2
(45) Date of Patent: Jun. 10, 2014

(54) PROTECTION MECHANISM FOR A COMMUNICATIONS NETWORK

(75) Inventors: Orazio Toscano, Genoa (IT); Sergio Lanzone, Genoa (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 536 days.

(21) Appl. No.: 13/119,637

(22) PCT Filed: Sep. 19, 2008

(86) PCT No.: PCT/EP2008/062534
§ 371 (c)(1),
(2), (4) Date: May 24, 2011

(87) PCT Pub. No.: WO2010/031444
PCT Pub. Date: Mar. 25, 2010

(65) Prior Publication Data
US 2011/0217035 A1    Sep. 8, 2011

(51) Int. Cl.
*H04B 10/032*   (2013.01)
*H04B 10/07*    (2013.01)

(52) U.S. Cl.
USPC ............................................. 398/5; 398/17

(58) Field of Classification Search
USPC ..................................................... 398/5, 17
See application file for complete search history.

(56) References Cited

U.S. PATENT DOCUMENTS

| | | | | |
|---|---|---|---|---|
| 2003/0223728 | A1* | 12/2003 | Maeda et al. | 385/140 |
| 2004/0047628 | A1* | 3/2004 | Passier et al. | 398/15 |
| 2009/0003195 | A1* | 1/2009 | Pitchforth, Jr. | 370/218 |
| 2009/0103915 | A1* | 4/2009 | Aprile et al. | 398/2 |

OTHER PUBLICATIONS

PCT International Search Report, dated Jul. 14, 2009, in connection with International Application No. PCT/EP2008/062534.
PCT Written Opinion, dated Jul. 14, 2009, in connection with International Application No. PCT/EP2008/062534.
Pitchforth, D. et al. "Increasing Robustness of Protection Schemes" Optical Fiber Communication/National Fiber Optic Engineers Conference, 2008. IEEE, Piscataway, NE, USA, Feb. 24, 2008, pp. 3, XP031391414, ISBN: 978-1-55752-856-8.
Suwalo, G. et al. "SONET/SDH—Like resilience for IP networks: a survey of traffic protection mechanisms" IEEE Network, IEEE Service Center, New York, NY, US, vol. 18, No. 2, Mar. 1, 2004, pp. 20-25, XP011109499, ISSN: 0890-8044.

* cited by examiner

*Primary Examiner* — Nathan Curs
(74) *Attorney, Agent, or Firm* — Leffler Intellectual Property Law, PLLC; Kenneth B. Leffler

(57) ABSTRACT

The invention relates to a protection mechanism for a communications network. A node, a method, a computer program product and a communications network to provide protection for an optical communications network are disclosed. Communications traffic is selecting from a working path in the optical network. A first fault condition is determining on the working path. The communications traffic is selected from a protection path in the optical network in response to clearing of the first fault and determining a second fault condition on the working path within a first predetermined time period of determining the first fault condition.

14 Claims, 7 Drawing Sheets

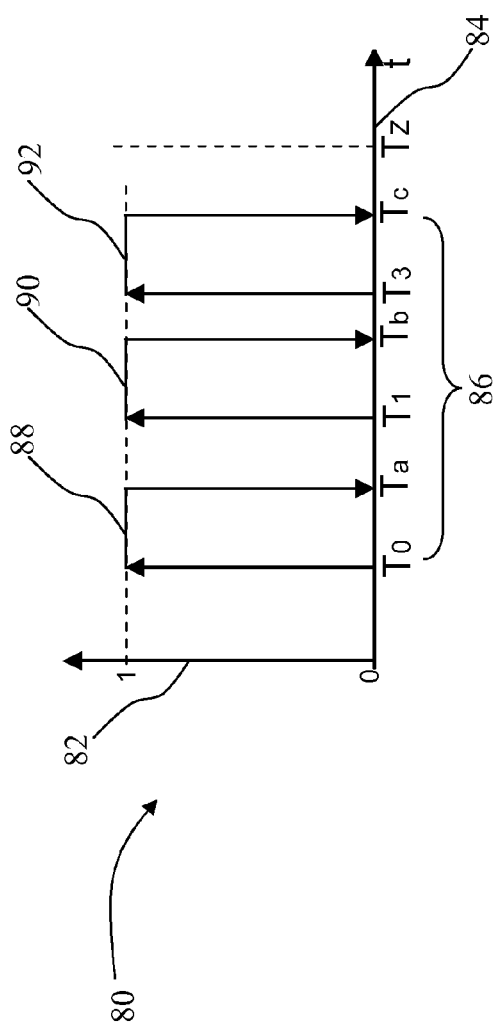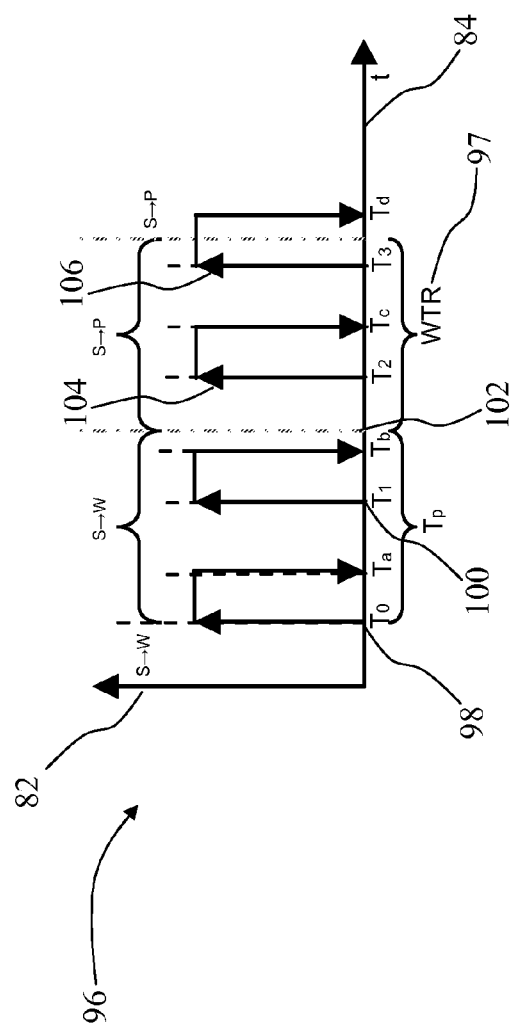

Fig 8

Table 130 (callout 132):

| Rev/NRev | HF | WTR | Firm fail | Short time fail | Blinking fail |
|---|---|---|---|---|---|
| NRev | N | NA | Y | N | Y |
| Rev | N | N | Y | N | N |
| Rev | N | Y | Y | N | Y |
| NRev | Y | NA | Y | Y | Y |
| Rev | Y | N | Y | Y | Y |
| Rev | Y | Y | Y | Y | N |

Fig 9

Table 140 (callout 142):

| Rev/NRev | Tp | WTR | Firm fail | Short time fail | Blinking fail |
|---|---|---|---|---|---|
| NRev | N | NA | Y | N | Y |
| Rev | N | N | Y | N | N |
| Rev | N | Y | Y | N | Y |
| NRev | Y | NA | Y | Y | Y |
| Rev | Y | N | Y | Y | Y |
| Rev | Y | Y | Y | Y | Y |

PROTECTION MECHANISM FOR A COMMUNICATIONS NETWORK

TECHNICAL FIELD

The invention relates to a protection mechanism for a communications network, and in particular to a node, a method, a computer program product and a communications network to provide protection for an optical communications network.

BACKGROUND

There are many different types of protection mechanism that may be used in an optical communications network. Such protection mechanisms aim to provide protection in the event of failures of paths, links or devices within the network so that disruptions to communications services or loss of traffic are minimised.

It is known to provide a Sub-Network Connection Protection (SNCP) mechanism in a network operating a Synchronous Digital Hierarchy (SDH) protocol. Such a protection mechanism may use 1+1 protection where traffic in the network is actively transmitted from a source node to a sink node on both a worker path and a main protection path, and a selector device at the sink node is responsible for deciding which path to use. Alternatively 1:1 protection may be used where the traffic is only transmitted on the working path but a main protection path is allocated and used for sending traffic when a failure of the worker path occurs. Such 1+1 or 1:1 protection may be implemented as revertive protection or non-revertive protection. Revertive protection requires that traffic is switched to a protection path when the worker path fails, and then back to a worker path when the worker is available for use. Non-revertive protection requires that traffic stays on the protection path even when the worker path is available for use.

It is also known to provide nested protection to a worker path whereby a portion of the worker path may be further protected with a nested protection path. If the portion of the worker path fails then the nested protection path can be used for traffic. Such network protection provides protection for so-called "firm failures" which may be a permanent and complete failure of a path for longer than approximately 100 ms referred to by the International Telecoms Union standard ITU-T G.841.

In certain circumstances switching to the nested protection path can also trigger switching to the main protection path which may be unnecessary if switching to the nested protection path has restored the connection. It is known to define a Hold-Off (HF) time $T_x$ at the sink node, according to the ITU-T G.841 standard, to prevent switching to the main protection path in the situation when switching to the nested protection path is an effective solution. The HF time is a period of time, typically between 50 ms and 2 s, to allow the nested protection path to restore the connection. If the nested protection path has not restored the connection at the end of the HF time then the main protection path is used for traffic. The HF time can be used to avoid unwanted protection switching events in the case of failures that are "short time" failures i.e. less than approximately 50 ms as referred to by the ITU-T G.841 standard.

When implementing revertive protection it is also known to define a Wait-to-Restore time (WTR) $\Delta t$, according to the ITU-T G.841 standard, such that once the traffic is switched to the protection path the selector at the sink node waits before switching back to the working path. The selector will only switch to the worker path if it is without failures during the whole of the wait-to-restore time. Typically the WTR time is of the order of 5-12 minutes.

SUMMARY

An object of the invention is to provide an improved way of providing a protection mechanism for a communications network.

According to a first aspect of the invention there is provided a method of protecting communications traffic in an optical communications network. The method comprising selecting the communications traffic from a working path in the optical network. The method comprising determining a first fault condition on the working path. The method comprising selecting the communications traffic from a protection path in the optical network in response to clearing of the first fault and determining at least a second fault condition on the working path within a first predetermined time period of determining the first fault condition.

Such a method allows a periodic failure, such as a blinking failure, to be detected so that traffic can be switched to a protection path. The method further provides the advantage of avoiding the continuous oscillation between selection of traffic from the worker path or the protection path each time a failure condition on the worker path is detected and cleared. The method may also reduce the amount of traffic that may be lost when a failure is detected.

The method may further include selecting the communications traffic from the protection path in response to determining that a fault condition is still present at the end of the first predetermined time period following determining of the first fault condition. This provides the advantage of allowing the method to provide protection by switching to a protection path in the event that the second failure has not cleared when the time period has ended.

The method may further include selecting the communications traffic from the working path following a second predetermined time period in which no faults were detected on the working path. The method may include using a Wait-to-Restore time as defined in the ITU G.841 standard as the second time period.

The method may further include switching of the communications traffic to the protection path before selecting said protection path. This may provide the advantage of minimising loss of traffic in the event of switching to the protection path.

In one embodiment the first time period is >50 ms, and may be <100 ms. In an alternative arrangement the first time period may be up to 2 seconds, and more preferably between 50 ms and 2 seconds. Preferably the first predetermined time period is greater than or equal to the hold-off time defined in ITU G.841.

According to a second aspect of the invention there is provided a node of an optical communications network, the node comprising an input arranged to receive communications traffic from a working path and a protection path in the optical network. The node having a fault detection unit arranged to detect fault conditions on the working. The node having a selector arranged to select the communications traffic from the protection path in the optical communications network in response to clearing of a first fault and the fault detection unit determining at least a second fault on the working path within a first predetermined time period.

Such a node allows a periodic failure, such as a blinking failure, to be detected so that traffic can be switched to a protection path. The node further provides the advantage of avoiding the continuous oscillation between selection of traffic from the worker path or the protection path each time a failure condition on the worker path is detected and cleared. The node may also reduce the amount of traffic that may be lost when a failure is detected.

The selector may be further arranged to select the communications traffic from the protection path in response to the fault detection unit determining that a fault condition is still present at the end of the first predetermined time period following determining of the first fault. This allows the node to switch to a protection path in the event that the second failure has not cleared when the first time period has ended.

The selector may be arranged to select the communications traffic from the working path following a second predetermined time period in which no faults were detected on the working path. The second time period may be a Wait-to-Restore time as defined in the ITU G.841 standard.

The node may be further arranged to instruct switching of the communications traffic to the protection path before selecting said protection path. This may provide the advantage of minimising loss of traffic in the event of switching to the protection path.

Preferably the first predetermined time period is greater than or equal to the hold-off time defined in ITU G.841.

According to a third aspect there is provided a computer program product operable to perform the method of the first aspect, or operable to control the node of the second aspect.

According to a fourth aspect of the invention there is provided a communications network configured using the method of the first aspect, or using a node according to the second aspect, or arranged to implement a computer program product according to the third aspect.

According to an alternative characterisation of the invention there is provided a method of protecting communications traffic in an optical communications network. The method comprising selecting the communications traffic from a working path in the optical network. The method further comprising determining a fault condition on the working path. The method further comprising incrementing a counter in response to determining a fault on the working path within a predetermined time period. The method further comprising selecting the communications traffic from a protection path in the optical network in response to the counter being incremented more than once.

It will be appreciated that any preferred or optional features of one aspect of the invention may also be preferred or optional feature of other aspects of the invention.

BRIEF DESCRIPTION OF THE DRAWINGS

Other features of the invention will be apparent from the following description of preferred embodiments shown by way of example only with reference to the accompanying drawings, in which;

FIG. 4 show a graph illustrating a blinking failure;

FIG. 5 shows a graph to describe how the protection mechanism operates with a Wait-to-Restore time according to an embodiment of the present invention;

FIG. 8 shows a table summarising how prior art protection mechanisms handle failures; and FIG. 9 shows a table summarising how a protection mechanism according to an embodiment of the invention handles failures.

DETAILED DESCRIPTION

Figure 1:
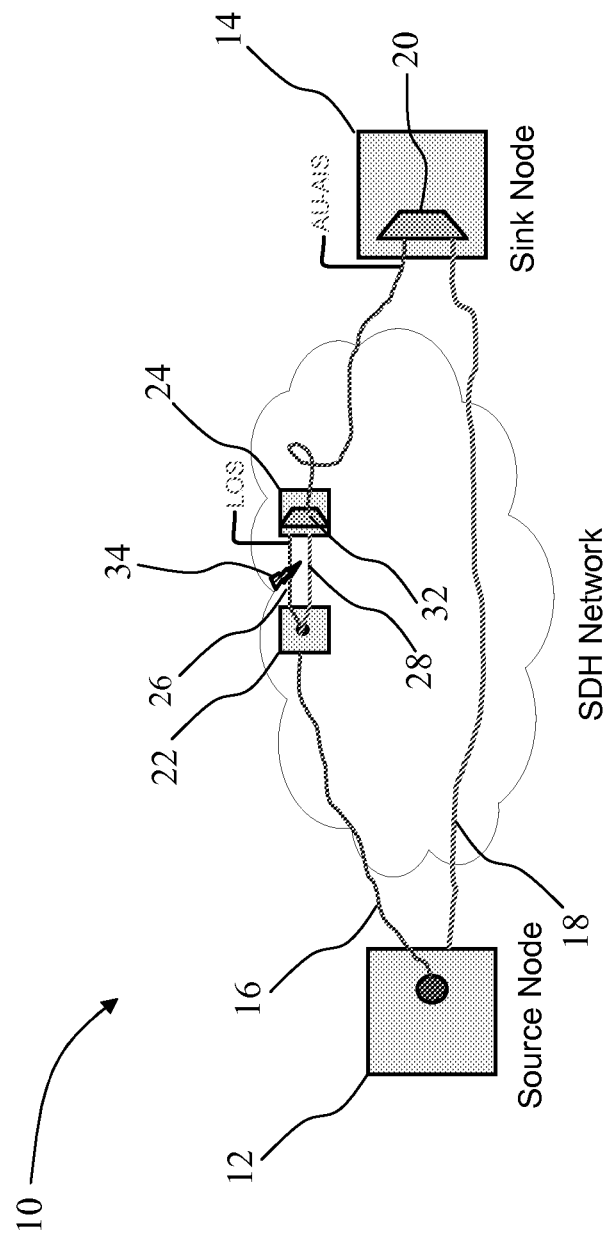
FIG. 1 shows a communications network operating a Synchronous Digital Hierarchy protocol.

FIG. 1 shows a communications network operating a Synchronous Digital Hierarchy protocol, generally designated 10, which is used as a reference network for describing embodiments of the present invention. The network 10 has a source node 12 and a sink node 14, which have a worker path 16 and a protection path 18 between them to provide 1+1 protection. The sink node 14 has a selector 20 which is operable to select traffic from the worker path 16 or the protection path 18 depending on which path 16, 18 delivers the traffic in the best condition to the sink node. Two intermediate nodes 22, 24 are shown in the worker path 16 having a section 26 of the worker path 16 between them. It will be appreciated that the paths 16, 18 may cross many additional network devices such as other nodes of the network which have been omitted for the purposes of clarity. A nested protection path 28 is also provided between the intermediate nodes 22, 24 to provide 1+1 protection to the section 26 of the worker path 16. The intermediate node 24 has an intermediate selector 32 which is operable to select traffic from the nested protection path 28 in the event of a failure 34 of the section 26 of the worker path 16. For the purposes of simplicity only the protection mechanism from the source node 12 to the sink node 14 will be described in detail but it will be appreciated that in the real world implementation a bidirectional protection mechanism may be provided to provide protection in the opposite direction.

Figure 2:
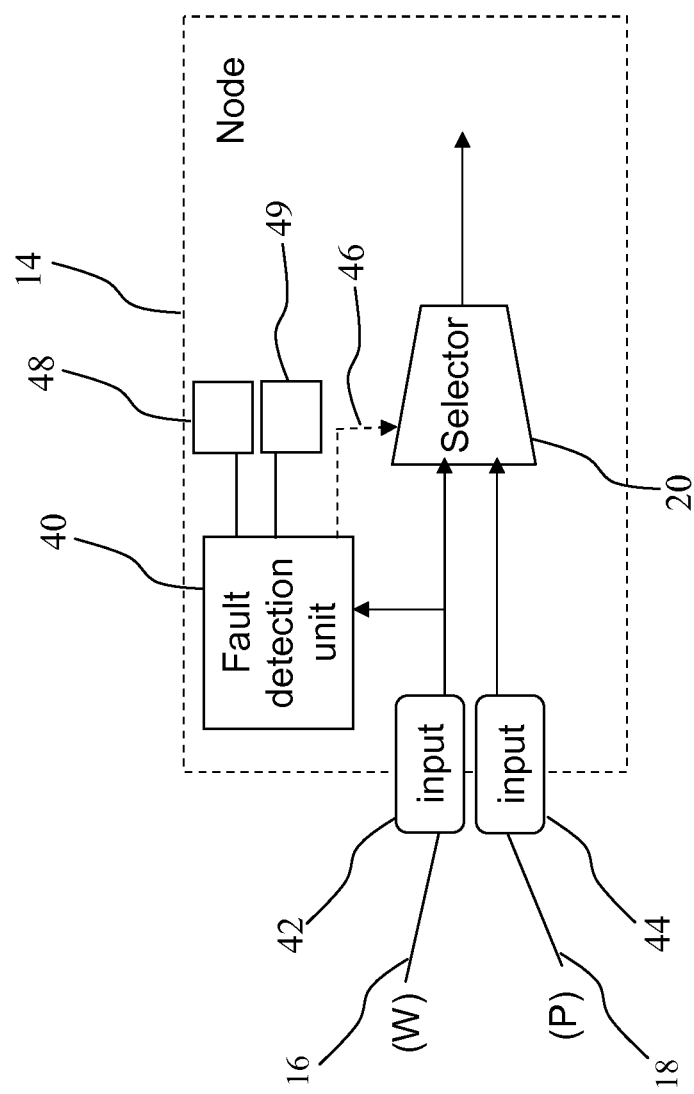
FIG. 2 shows a fault detection unit in a sink node of FIG. 1 according to an embodiment of the invention.

FIG. 2 shows a fault detection unit 40 in the sink node 14 of FIG. 1 according to an embodiment of the invention. In FIG. 2 like features to FIG. 1 are shown with like reference numerals. In FIG. 2 the fault detection unit 40 may be a traffic card of the node 14 which is operable to perform non-intrusive monitoring of the working path 16. The node 14 has a worker input 42 associated with the worker path 16, and a protection input 44 associated with the protection path 18. Each of the worker input 42 and the protection input 44 is in communication with the selector 20. The worker input 42 is also in communication with the fault detection unit 40. The fault detection unit 40 is operable to detect a fault on the worker path 16 and to send a control signal 46 to the selector 20 to instruct it to choose traffic from either the worker path 16 or the protection path 18. The fault detection unit 40 is also in communication with a counter 48 which is operable to record the number of faults on the worker path 16 in a period of time $T_p$ which will be described in greater detail with reference to FIGS. 3 to 8. In FIG. 2 a clock 49 is shown in communication with the fault detection unit 40 which is operable to define the period of time $T_p$. It will be appreciated that the intermediate node 24 may have similar arrangements to the node 14 described in FIG. 2 to enable it to select traffic from the section 26 of the worker path 16 or the nested protection path 28 in response to detection of a fault on the section 26.

Figure 3:
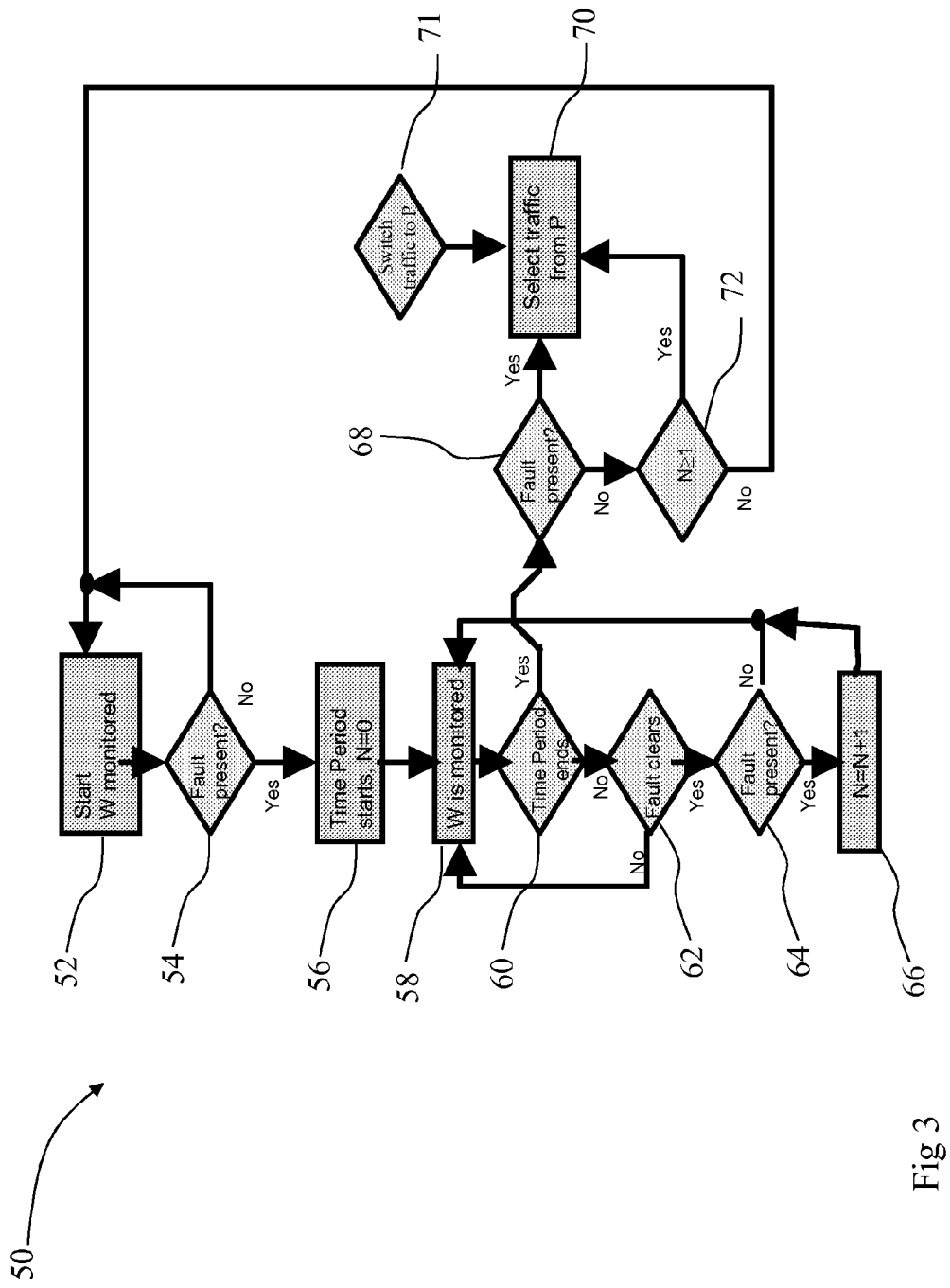
FIG. 3 shows a flow diagram describing a method according to an embodiment of the present invention.

FIG. 3 shows a flow diagram describing a method according to an embodiment of the present invention, generally designated 50. The method 50 is a protection mechanism that may be implemented at the sink node 14 or the intermediate node 24 as required. The method 50 starts monitoring the worker path 16 at step 52. The method then determines whether a fault is present on the worker path 16 at step 54. If no fault is present the method returns to monitoring the worker path at step 52 to repeat the steps 52 and 54. If a fault is detected on the worker path the time period $T_p$ is started by the clock 49, and the counter 48 is initiated to show, for example N=0 as shown at step 56.

A fault may be detected using a Loss of Signal (LOS) message or other mechanisms as would be appreciated in the art. Such monitoring at step 52 and determining at step 54 of faults may be performed by the fault detection unit 40 of FIG. 2. During the time period $T_p$ the worker path is continuously monitored for defects as shown at step 58. The method then determines if the time period $T_p$ has ended as shown at step 60, which may be performed by communication with the clock 49. If the time period $T_p$ has not ended the method determines whether the fault has cleared as shown at step 62. If the fault has not cleared the method returns to monitoring the worker path as shown at step 58 and repeats the step 60 to determine if the time period $T_p$ has ended, and the step 62 to determine whether the fault has cleared. Such clearing of the fault may be determined by the lack of LOS messages as would be appreciated in the art. If the fault has cleared at step 62, the method continues to determine whether the fault is still present on the worker path 16 as shown at step 64. If the fault is not present the method returns to monitoring the worker path as shown at step 58, and then repeats the step 60 to determine if the time period $T_p$ has ended, the step 62 to determine whether the fault has cleared, and the step 64 to determine whether the fault is still present on the worker path 16. If the method determines that the fault is still present at step 64, the counter 48 is incremented by one as shown at step 66 so that N=N+1. The method then returns to monitoring the worker path as shown at step 58, and then repeats the step 60 to determine if the time period $T_p$ has ended, the step 62 to determine whether the fault has cleared, and the step 64 to determine whether the fault is still present on the worker path 16.

If the method determines that the time period $T_p$ has ended at step 60 the method then determines if the fault is still present as shown at step 68. If the fault is still present the traffic is selected from the protection path 18 as shown at step 70. If the fault is not present at step 68, the method reads the counter as shown at step 72 to determine whether N≥1. If N is not ≥1 then the method continues to select traffic from the worker path 16 and returns to the start at step 52 and continues to monitor the worker path 16. If the counter does read N≥1 this means that more than one fault has been detected within the time period $T_p$ so the method selects the traffic from the protection path 18 as shown at step 70.

If the counter 48 records that N=0 at the end of the time period $T_p$ this means that one fault has been detected which has either cleared by the end of the time period $T_p$, or is still present at the end of the time period $T_p$. If the fault is still present at the end of the time period $T_p$ then the traffic is selected from the protection path as shown at step 70. If the fault has cleared at the end of the time period $T_p$ then the failure is treated as a short duration failure and traffic is still selected from the worker path 16 as shown at step 72 and the method returns to the start at step 52 and continues to monitor the worker path. Such a short duration failure is referred to in the ITU-T G.841 standard as less than approximately 50 ms.

If the counter 48 records that N=1 at the end of the time period $T_p$ this means that one fault has been detected and cleared, and a second fault has been detected which may have cleared by the end of the time period $T_p$, or may still be present at the end of the time period $T_p$. In either case the traffic is selected from the protection path as shown at step 70. This part of the method 50 is used to detect the presence of failures which are repeated failures known as blinking failures described with reference to FIG. 4. It will be appreciated that the number of short faults required to trigger the protection switching may be configurable such that the counter 48 may record for example N=2, 3, 4 or more. It will also be appreciated that the method 50 may include switching of the communications traffic to the protection path before selecting said protection path at step 71.

FIG. 4 shows a graph illustrating an example of a blinking failure, generally designated 80. The graph 80 has a y-axis 82 which indicates the presence of a failure on the worker path 16, and an x-axis 84 which represents time. On the y-axis 82 a value of one indicates the presence of a failure, and a value of zero indicates that there is no failure or that a failure has cleared. On the x-axis 84 the time period $T_p$ described with reference to FIG. 3 is shown having a value of $T_p=T_z-T_o$. In FIG. 4 the graph 80 shows a blinking failure 86 comprising three individual failures 88, 90, 92. Each failure 88, 90, 92 may be 5 ms or 10 ms in duration, but may be up to 20 ms in duration. The blinking failure 86 may be defined as a series of failures, i.e. more than one, that are not continuously present, but appear and clear more than once in a given period of time as shown in FIG. 4. The graph 80 shows that failures 88, 90, 92 are detected at $T_0$, $T_1$ and $T_3$, and that each failure 88, 90, 92 clears at $T_a$, $T_b$, $T_c$ respectively. According to an embodiment of the invention if the period of time $T_p$ is set appropriately a blinking failure 86 can be detected using the method and apparatus described above so that a protection path 18 is used for traffic.

FIG. 5 shows a graph to describe how the protection mechanism operates with a Wait-to-Restore (WTR) time according to an embodiment of the present invention, generally designated 96. Like features to the embodiment of FIG. 4 are shown with like reference numerals. FIG. 5 describes the behaviour of the protection mechanism for a general case which uses the period of time $T_p$ using the method of FIG. 3 and the WTR time 97 according to the standard ITU-T G.841. In FIG. 5 before time $T_o$ the traffic is selected from the worker path 16 as shown by the notation S→W. At time $T_o$ a first fault 98 is detected which starts the time period $T_p$ and sets the counter 48 to N=0. At time $T_a$ the first fault 98 clears. A second fault 100 is then detected at time $T_1$ which increments the counter 48 to N=1. The second fault 100 then clears at time $T_b$. The time period $T_p$ subsequently ends as shown at 102. During the time period $T_p$ the traffic is still selected from the worker path 16 as shown by the notation S→W. Since the method 50 has determined that N=1 and the time period $T_p$ has ended, the traffic is now selected from the protection path 18 as indicated by the notation S→P. During the WTR time 97 a third fault 104 is detected at time $T_2$, which subsequently clears at time $T_c$. A fourth fault 106 is then detected during the WTR time 97 which only clears at time $T_d$ after the WTR time 97 has ended. The counter 48 is not incremented when the third fault 104 or the fourth fault 106 are detected. Since the fourth fault 106 only clears after the WTR time 97 has ended the traffic is still selected from the protection path 18 as indicated by the notation S→P. It will be appreciated that if there had been no faults present during the WTR time 97 the traffic would have been switched to the worker path 16 at the end of the WTR time 97.

Figure 6:
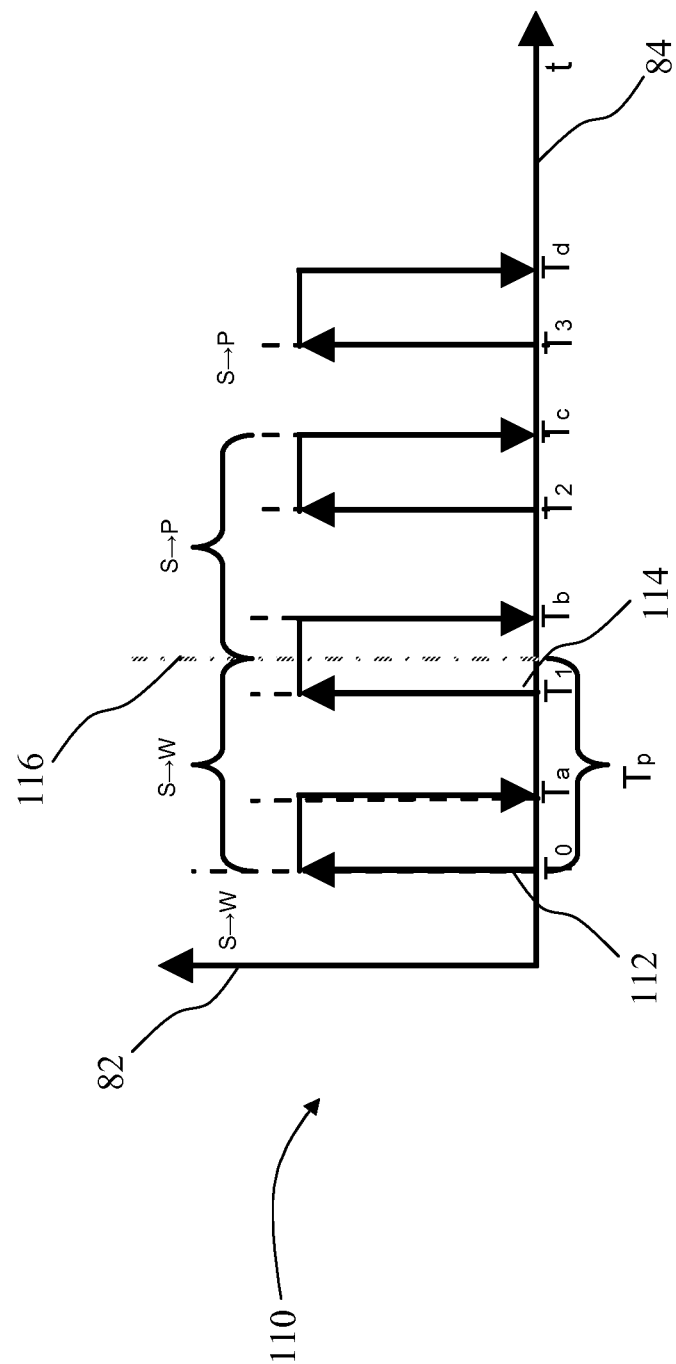
FIGS. 6 and 7 show graphs to describe how the protection mechanism operates according to an embodiment of the present invention.
Figure 7:
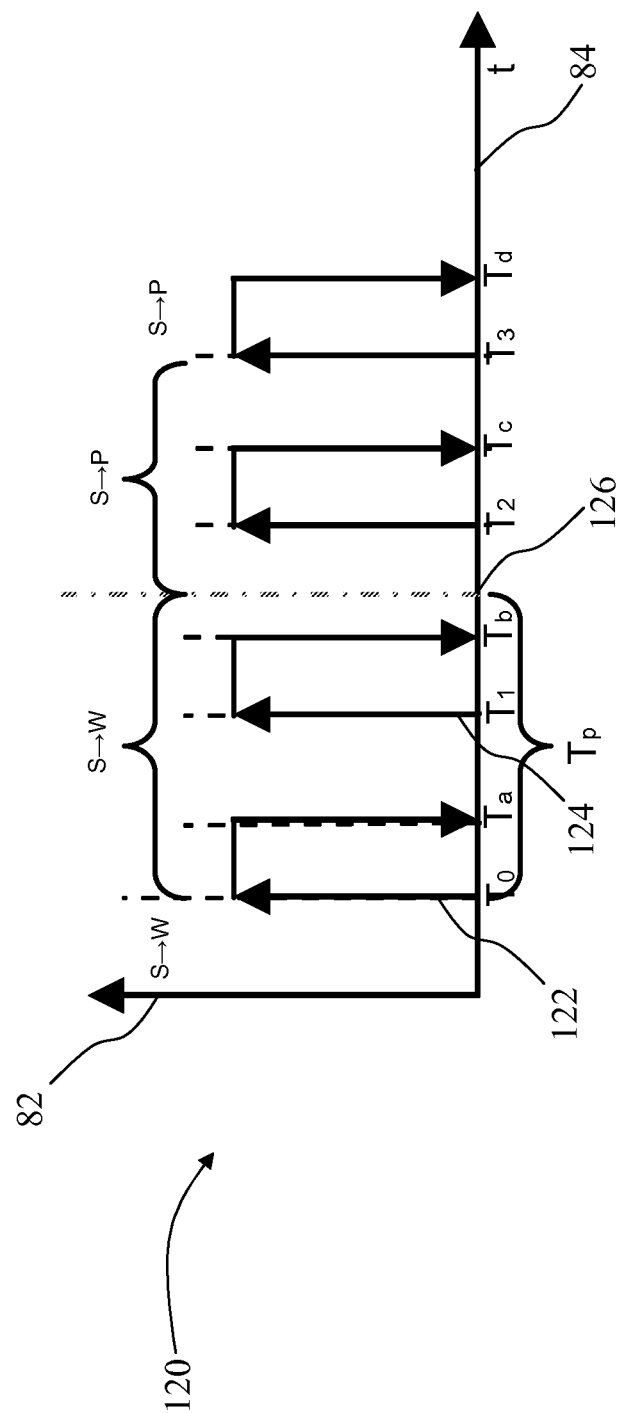

FIGS. 6 and 7 show graphs to describe how the protection mechanism operates according to an embodiment of the present invention, generally designated 110 and 120. Like features to the embodiments of FIGS. 4 and 5 are shown with like reference numerals. In FIG. 6 the graph 110 shows that before time $T_o$ the traffic is selected from the worker path 16 as shown by the notation S→W. At time $T_o$ a first fault 112 is detected which starts the time period $T_p$ and sets the counter 48 to N=0. At time $T_a$ the first fault 112 clears. A second fault 100 is then detected at time $T_1$ which increments the counter 48 to N=1. The time period $T_p$ ends as shown at 116, and then the second fault 116 then clears at time $T_b$. During the time period $T_p$ the traffic is still selected from the worker path 16 as shown by the notation S→W. Since the method 50 has determined that the second fault 114 is still present at the end of the time period $T_p$, and that N=1 at the end of the time period $T_p$ the traffic is now selected from the protection path 18 as indicated by the notation S→P.

In FIG. 7 the graph 120 shows that before time $T_o$ the traffic is selected from the worker path 16 as shown by the notation S→W. At time $T_o$ a first fault 122 is detected which starts the time period $T_p$ and sets the counter 48 to N=0. At time $T_a$ the first fault 122 clears. A second fault 124 is then detected at time $T_1$ which increments the counter 48 to N=1. The second fault 124 clears at time $T_b$ and then the time period $T_p$ ends as shown at 126. During the time period $T_p$ the traffic is still selected from the worker path 16 as shown by the notation S→W. Since the method 50 has determined that N=1 at the end of the time period $T_p$, the traffic is now selected from the protection path 18 as indicated by the notation S→P. From FIGS. 6 and 7 it can be seen that the protection mechanism according to an embodiment of the present invention switches to the protection path when a failure is present at the end of the time period $T_p$ and when a failure is not present at the end of the time period $T_p$.

FIG. 8 shows a table summarising how prior art protection mechanisms handle failures, generally designated 130. The table 130 shows the various cases for revertive (Rev) and non-revertive (NRev) protection mechanisms which use a Hold-Off (HF) time and/or a WTR time according to the ITU G.841 standard. The table 130 shows the ability of the known protection mechanisms to handle firm, short time and blinking failures using the notation 'Y' for yes, and 'N' for no. The table 130 shows that for firm failures the known protection mechanisms are able to account for all combinations of HF time and WTR time with either revertive or non-revertive protection. The table also shows that short time failures are only able to be accounted for with non-revertive protection which uses a HF time, with revertive protection which uses a HF time but not a WTR time, and with revertive protection which uses a HF time and a WTR time. Furthermore the table also shows that the known protection mechanisms are not able to handle blinking failures with non-revertive protection which uses a HF time, or revertive protection which uses a HF time but not a WTR time, or with revertive protection which uses a HF time and a WTR time shown at 132.

FIG. 9 shows a table summarising how a protection mechanism according to an embodiment of the invention handles failures, generally designated 140. Similar notation to the table 130 of FIG. 8 is used in the table 140. In FIG. 9 the table 140 shows the various cases for revertive (Rev) and non-revertive (NRev) protection mechanisms which use a time period $T_p$ of the method of FIG. 3 and/or a WTR time according to the ITU G.841 standard. The table 140 shows that the protection mechanisms according to an embodiment of the invention are able to handle blinking failures with non-revertive protection which uses a time period $T_p$, and revertive protection which uses a time period $T_p$ but not a WTR time, and with revertive protection which uses a time period $T_p$ and a WTR time as shown at 142. Comparing the tables 130 and 140 in FIGS. 8 and 9 shows the improvement over the prior art when implementing a protection mechanism according to an embodiment of the invention.

Whereas the prior art protection mechanisms may provide some degree of protection for firm failures or short time failures, they are not an effective solution to provide protection in the case of failures which are repeated failures. Such repeated failures may be known as blinking failures described with reference to FIG. 4. Such a blinking failure may be commonly observed in Dense Wavelength Division Multiplexing (DWDM) networks when DWDM components degrade over time.

The prior art protection mechanisms react to blinking failures in different ways. In the case of known revertive protection which does not implement a HF time or a WTR time, the selector of the sink node will select the traffic from the protection path as soon as a failure is detected on the worker path. When the failure on the worker path clears, the selector will select the traffic from the worker path. As soon as the blinking failure is detected again on the worker path, the selector will switch to the protection path. Hence, the blinking failure may cause a continuous oscillation between selection of traffic from the worker or the protection path each time the failure condition on the worker path is detected and clears. Such behaviour of the prior art protection mechanism is undesirable. This oscillation may be avoided, reduced or minimised using the above described embodiments of the invention.

In the case of a prior art non-revertive protection mechanism which does implement a HF time, the selector of the sink node will wait for a period of $t_x$ after the detection of the failure on the worker path. In the case where a blinking failure is present on the worker path but the working path is operational at the end of the period $t_x$ the selector never switches to the protection path. Such a blinking failure causes intermittent traffic loss in the prior art protection mechanism every time the failure is present on the working path, which is undesirable. This intermittent traffic loss may be avoided, reduced or minimised using the above described embodiments of the invention.

In the case of a prior art revertive protection mechanism which implements a HF time without implementing a WTR time, the selector of the sink node will wait for a time period after the detection of the failure on the worker path. In the case where the blinking failure is present at the end of the HF time the selector will switch to the protection path, otherwise the selector will continue to select traffic from the worker path. Even if the selector switches to the protection path, it will switch back to the worker path as soon as the failure has cleared, which is undesirable. This behaviour may be avoided, reduced or minimised using the above described embodiments of the invention.

Alternatively, in the case of a prior art revertive protection mechanism which implements a HF time and a WTR time, the WTR time may slow down the oscillation of switching between the worker path and the protection path, but the problem of continuous switching between the worker path and the protection path is still present. Again, such oscillation may be avoided, reduced or minimised using the above described embodiments of the invention.

Whereas the embodiments described herein have been described for 1+1 protection it will be appreciated that they may be equally adapted to 1:1 protection, or 1:n protection, or n:m protection.

The invention claimed is:

1. A method of protecting communications traffic in an optical communications network, the method comprising:
   selecting the communications traffic from a working path in the optical network;
   determining a first fault condition on the working path; and
   selecting the communications traffic from a protection path in the optical network in response to detecting that, within a first predetermined time period of determining the first fault condition, the first fault cleared and at least a second fault condition on the working path occurred.

2. A method according to claim 1, and further including selecting the communications traffic from the protection path in response to determining that a fault condition is still present at the end of the first predetermined time period following determining of the first fault condition.

3. A method according to claim 1, further comprising selecting the communications traffic from the working path following a second predetermined time period in which no faults were detected on the working path.

4. A method according to claim 3, wherein the second time period is a value within a range of 5 to 12 minutes.

5. A method according to claim 1, and further including switching of the communications traffic to the protection path before selecting said protection path.

6. A method according to claim 1, wherein the first predetermined time period is greater than or equal to 50 milliseconds.

7. A node of an optical communications network, the node comprising:
- an input arranged to receive communications traffic from a working path and a protection path in the optical network;
- a fault detection unit arranged to detect fault conditions on the working path; and
- a selector arranged to select the communications traffic from the protection path in the optical communications network in response to detecting that, within a first predetermined time period of determining a first fault condition on the working path, the first fault cleared and the fault detection unit determined at least a second fault on the working path.

8. A node according to claim 7, wherein the selector is further arranged to select the communications traffic from the protection path in response to the fault detection unit determining that a fault condition is still present at the end of the first predetermined time period following determining of the first fault.

9. A node according to claim 7, wherein the selector is arranged to select the communications traffic from the working path following a second predetermined time period in which no faults were detected on the working path.

10. A node according to claim 9, wherein the second predetermined time period is a value within a range of 5 to 12 minutes.

11. A node according to claim 7, further arranged to instruct switching of the communications traffic to the protection path before selecting said protection path.

12. A node according to claim 7, wherein the first predetermined time period is greater than or equal to 50 milliseconds.

13. A non-transitory computer readable storage medium having stored therein a computer program that, when executed by a computer, causes the computer to perform a method of protecting communications traffic in an optical communications network, the method comprising:
- selecting the communications traffic from a working path in the optical network;
- determining a first fault condition on the working path; and
- selecting the communications traffic from a protection path in the optical network in response to detecting that, within a first predetermined time period of determining the first fault condition, the first fault cleared and at least a second fault condition on the working path occurred.

14. A communications network configured using a method of protecting communications traffic in an optical communications network, the method comprising:
- selecting the communications traffic from a working path in the optical network;
- determining a first fault condition on the working path; and
- selecting the communications traffic from a protection path in the optical network in response to detecting that, within a first predetermined time period of determining the first fault condition, the first fault cleared and at least a second fault condition on the working path occurred.

* * * * *